(No Model.) 3 Sheets—Sheet 1.

G. D. BURTON.
STOCK CAR.

No. 335,109. Patented Feb. 2, 1886.

WITNESSES
Jos. P. Livermore
J. J. Maloney

INVENTOR
Geo. D. Burton (No Model.) 3 Sheets—Sheet 2.

G. D. BURTON.
STOCK CAR.

No. 335,109. Patented Feb. 2, 1886.

WITNESSES
Jos. P. Livermore
J. J. Maloney

INVENTOR
Geo. D. Burton (No Model.)  
3 Sheets—Sheet 3.

G. D. BURTON.
STOCK CAR.

No. 335,109. Patented Feb. 2, 1886.

WITNESSES  
Jos. P. Livermore  
J. J. Maloney

INVENTOR  
Geo. D. Burton

UNITED STATES PATENT OFFICE.

GEORGE D. BURTON, OF NEW IPSWICH, NEW HAMPSHIRE.

STOCK-CAR.

SPECIFICATION forming part of Letters Patent No. 335,109, dated February 2, 1886.

Application filed August 31, 1885. Serial No. 175,692. (No model.)

*To all whom it may concern:*

Be it known that I, GEORGE D. BURTON, of New Ipswich, Hillsborough county, State of New Hampshire, have invented an Improvement in Stock-Cars, of which the following description, in connection with the accompanying drawings, is a specification, like letters on the drawings representing like parts.

My invention, relating to a car for transporting live stock, is shown embodied in a car having the same general arrangement as the car shown in Letters Patent No. 322,896, granted to me July 28, 1885—namely, having a central compartment or room for the attendant in charge of the stock, and having compartments at its ends provided with suitable appliances for feeding or watering the horses or cattle.

The present invention consists, mainly, in various details of construction, the object of which is to insure greater comfort and safety for the animals and their attendants. As shown in said Letters Patent, the compartments for the animals are provided with troughs for containing the grain or feed and water, and the space below the said troughs is boxed in and provided with suitable drains for carrying off the refuse or waste material. As shown in the former patent, the partition or boxing below the feed-troughs was vertical, and in such construction there is danger of the animals striking their knees and injuring themselves against this vertical partition.

One portion of the present invention consists in making the boxing or partition below the feed-troughs concave or receding from the rail at the front of the feed-trough, to which the animals are fastened, so that there is no danger of the animals striking their knees when standing as far forward as permitted by the said rail. In addition to the troughs for containing grain or chopped feed, the car is also provided with racks for hay, in a position accessible to the animals when fastened in the car.

The invention also consists in providing a set basin in the attendant's apartment, and a reservoir and means to connect it with the pipe through which water is supplied to the feeding-troughs in the car, and in further details of construction, which will be hereinafter specified.

Figure 1:
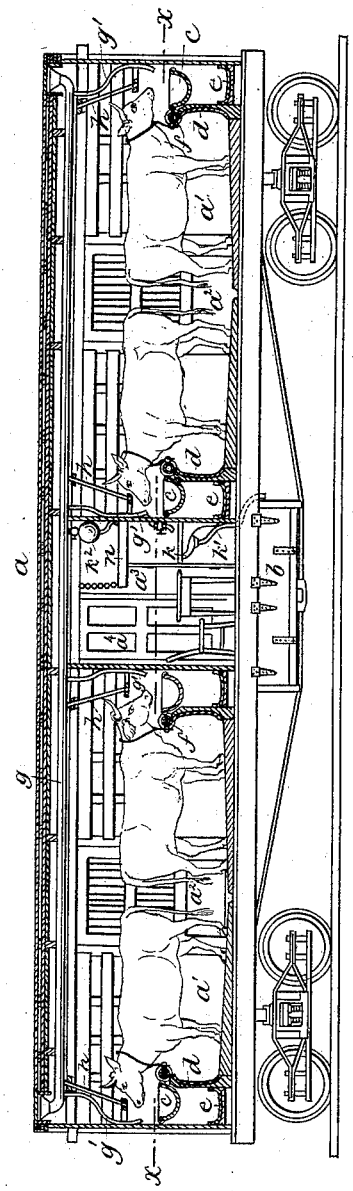
Figure 2:
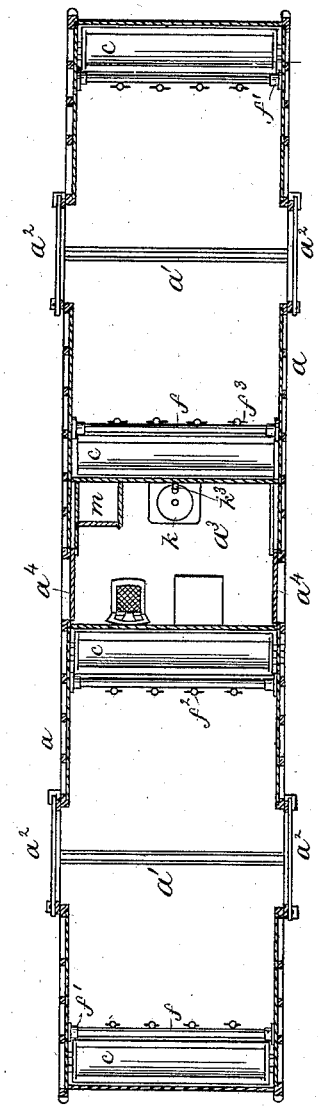
Figure 3:
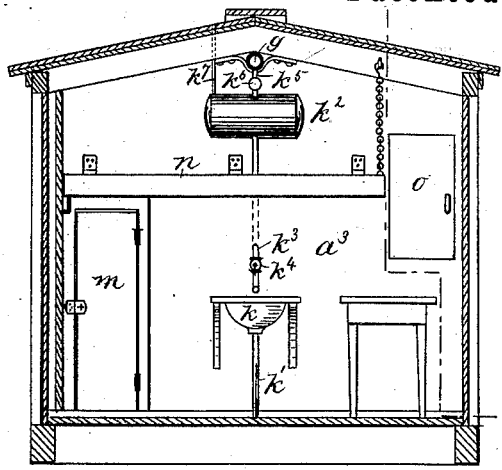
Figure 4:
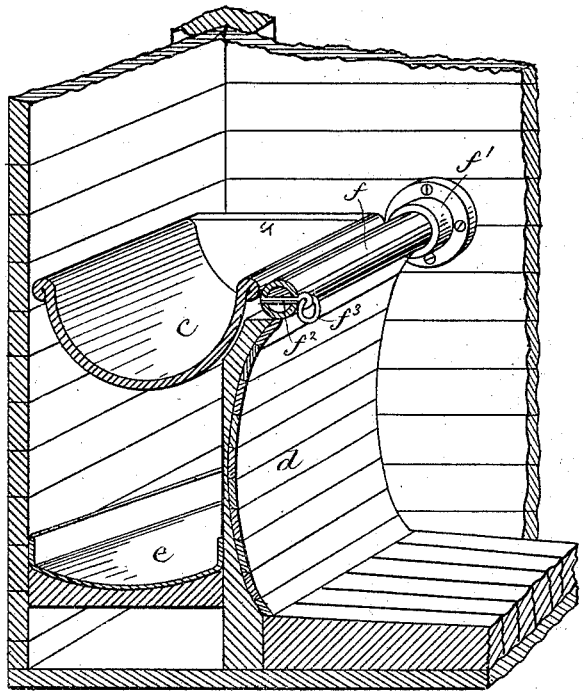
Figure 5:
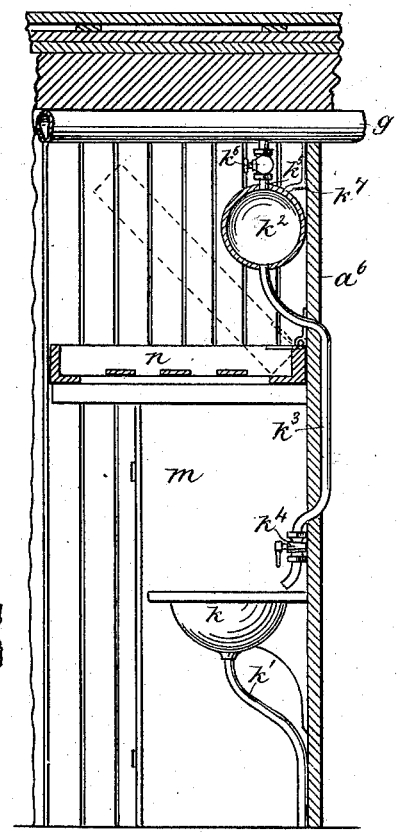
Figure 6:
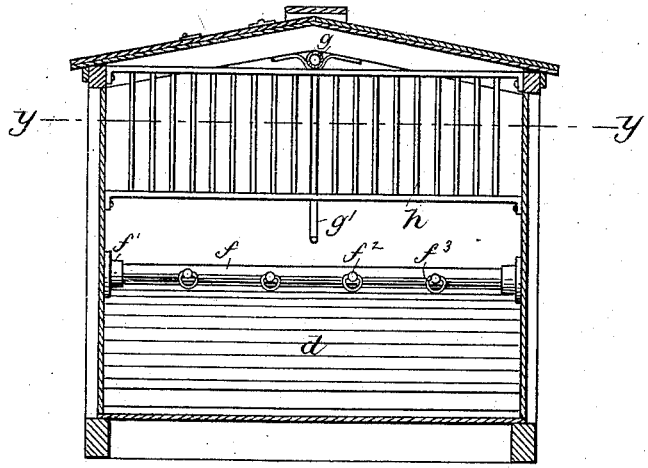
Figure 7:
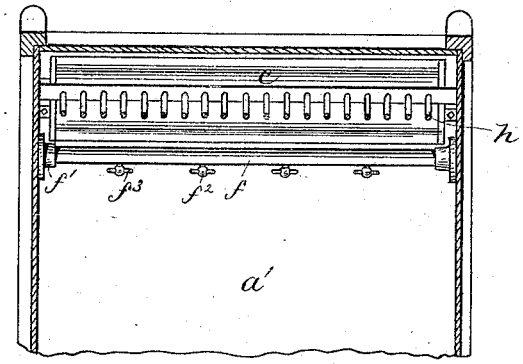

Figure 1 is a longitudinal vertical section of a stock-car embodying this invention; Fig. 2, a horizontal section thereof on lines $x\,x$; Fig. 3, a transverse section through the attendant's apartment; Fig. 4, a detail showing a portion of one of the feed-troughs and the fastening-rail for the animals, and boxing or partition beneath concaved to prevent injury to the animals; Fig. 5, a longitudinal sectional detail showing the basin and reservoir and sleeping-berth in the attendant's room; Fig. 6, a transverse vertical section through one of the cattle-compartments, showing the hay-rack in front elevation; and Fig. 7, a horizontal section on line $y\,y$ of Fig. 6.

The car-body $a$ may be of any suitable or usual construction, being shown as having end compartments, $a'$, provided with doors $a^2$ at the sides of the car, and a central compartment, $a^3$, with doors $a^4$, for the attendant in charge of the animals in the end compartments. There is a feed-receptacle, $b$, beneath the middle compartment, $a^3$, and the end compartments are provided with feed-troughs $c$, the space below which is inclosed by a partition or boxing, $d$, and contains suitable drain-troughs, $e$, for carrying off the material emptied from the feed-troughs, which may be of usual construction and mounted upon bearings at their ends to admit of their being inverted for the purpose of emptying them. At the front of the troughs the cars are provided with fastening-rails $f$, (best shown in Fig. 4,) preferably consisting of iron tubing secured at its ends in suitable sockets, $f'$, fastened upon the sides of the car and provided with transverse eyebolts $f^2$, containing rings $f^3$, to which the animals are tied, as shown in Fig. 1, this tubing being especially suitable for a fastening-rail on account of its strength and because it has no sharp angles or edges to injure the animals. The partition or boxing $d$, inclosing the space below the troughs, is concave or recedes from beneath the fastening-rail $f$, as shown, thus affording sufficient space for the animals to bend their fore legs without striking their knees against this boxing or partition, as frequently happens when it extends vertically downward from the front of the trough or fastening-rail.

The car is provided with the usual longitudinal water-pipe, $g$, having branches $g'$ for supplying the troughs c. In addition to the feed-troughs, the car also contains hay-racks h, extending across the compartment for live stock, above the feed-troughs, and thus affording increased facility for properly feeding the animals while being transported.

The attendant's compartment $a^5$, in addition to the usual furniture, contains a set basin, k, having a waste-pipe, $k'$, extending down through the bottom of the car, and said compartment also contains a tank or reservoir, $k^2$, having a delivery-pipe, $k^3$, leading to the basin k, and provided with a suitable faucet or stop-cock, $k^4$, the said reservoir being also connected by an inlet-pipe, $k^5$, with the main water-supply pipe g of the car, as best shown in Fig. 5, the said pipe $k^5$ containing a valve or stop-cock, $k^6$, so that the reservoir $k^2$ may be cut off from the water-pipe, when desired—as, for instance, in cold weather, when there is danger of the water freezing in the reservoir, and thus bursting it. At other times the valve $k^6$ may remain open, and the reservoir $k^2$ will be filled whenever a supply of water is poured into the pipe g for the purpose of supplying the troughs c. The reservoir $k^2$ may be provided with a vent-pipe, $k^7$, extending out through the top of the car, to permit the air to escape from and enter the reservoir when introducing or withdrawing the water. The central compartment is also provided with a closet or locker, m, and a sleeping-berth, n, preferably placed above the closet m and hinged to the partition $a^6$, so that it may be raised when not in use, as shown in dotted lines, Fig. 5.

The central compartment is provided with doors o, (see Fig. 3,) opening into the end compartments above the feed-troughs.

If desired, the end compartments of the car may have partitions extending from the feed-troughs to form separate stalls for horses.

I claim—

1. In a stock-car, the combination, with feed-troughs, of a concave or receding partition or boxing for inclosing the space below the said troughs, to avoid danger of injury to the animals, substantially as described.

2. In a stock-car, the combination, with feed-troughs, of a fastening-rail composed of iron tubing, and fastening-rings attached thereto, and a receding or concave partition below the said fastening-rail, substantially as and for the purpose set forth.

3. A stock-car provided with compartments for live stock and feed-troughs therein, and a separate compartment for an attendant, combined with a water-pipe discharging into the said troughs for supplying the animals with water, and a water-tank connected with the said pipe and having a delivery-pipe in the attendant's compartment, affording a supply of water for the attendant, substantially as described.

4. A stock-car having compartments provided with feed-troughs for live stock, and a separate compartment for the attendant, and a set basin in the attendant's compartment, and a water-pipe for supplying the said feed-troughs, combined with a reservoir connected with the said water-pipe and having a delivery-pipe leading to the said basin, substantially as described.

5. In a stock-car, the combination, with the water-pipe g, for supplying the animals with water, of the reservoir $k^2$, and pipe connecting the same with the water-pipe, and the valve in the said connecting-pipe, substantially as and for the purpose described.

In testimony whereof I have signed my name to this specification in the presence of two subscribing witnesses.

GEO. D. BURTON.

Witnesses:
WILLIAM H. NASH,
JOS. P. LIVERMORE.